(No Model.)

F. H. HAWKINS.
ICE HOLDER FOR BUTTER DISHES, &c.

No. 315,619. Patented Apr. 14, 1885.

Witnesses
A. Ruppert
Alfred T. Gage

Inventor:
F. H. Hawkins
Per
Thomas P. Simpson

UNITED STATES PATENT OFFICE.

FREDERICK H. HAWKINS, OF BROOKLYN, NEW YORK.

ICE-HOLDER FOR BUTTER-DISHES, &c.

SPECIFICATION forming part of Letters Patent No. 315,619, dated April 14, 1885.

Application filed September 6, 1884. (No model.)

*To all whom it may concern:*

Be it known that I, FREDERICK H. HAWKINS, of Brooklyn, in the county of Kings and State of New York, have invented a new and useful Ice-Holder, of which the following is a specification.

The object of my invention is to provide means to keep cool butter and other articles of food while in use.

Figure 1:
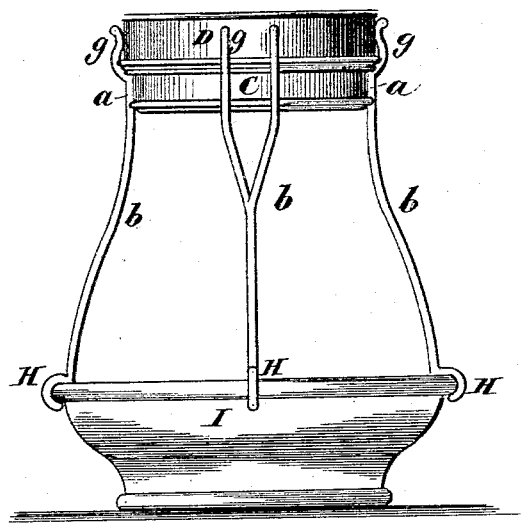
Figure 2:
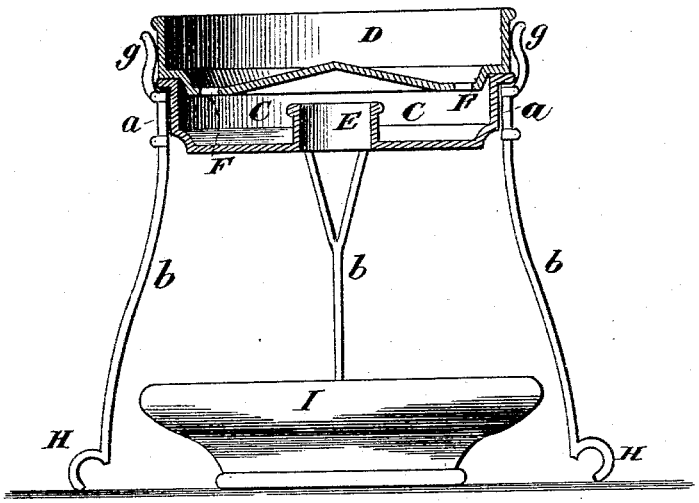

In the accompanying drawings, Figure 1 is a view of the cooler and stand attached to a butter-dish. Fig. 2 is a vertical section showing cooler and stand with dish between legs and not attached.

Similar letters of reference designate corresponding parts in each view.

$a$ is the stand; $b\, b\, b$, legs of stand; C, receptacle for water; D, receptacle for ice; E, tube through bottom of lower receptacle; F, flange to lower receptacle; $g\, g$, guides which hold upper receptacle in place; H, feet on lower end of legs of stand; I, butter-dish.

The receptacles and stand may be of such a shape as shall be best suited for the purpose in view, and made of any suitable material. The upper receptacle, D, will have a corrugated bottom, with holes pierced between the corrugations to allow the air to circulate around the ice, and also to permit the water to drain into the lower receptacle, C. The lower receptacle, C, will be provided with a tube, E, passing through the bottom and extending nearly as high as the side of receptacle. The object of this is to provide means for the cold air to drop through.

The receptacles C and D are supported on the stand $a$ by flanges, and held in place by the guides $g\, g$ in such a way as to be easily removed for cleaning and other purposes. The lower part of legs of stand can be made of such shape that they will fit on the edge of any dish; or it can stand on the table with the dish between the legs.

What I claim as my invention, and desire to secure by Letters Patent, is—

1. An open frame combined with an ice-holder, the two relatively constructed so that the ice-holder will be supported in the frame above a space adapted to contain the butter or other dish directly under said ice-holder, whereby the contents of dish will not only be cooled by a downward flow of cool air, but will be within reach of persons at the table without lifting a cover.

2. An open frame and an ice-holder adapted to sit in the upper part thereof, in combination with a drip-vessel, C, having the central open tube, E, and arranged under the ice-holder to receive the drip around said tube from perforations in a concave around an upward convexity of the ice-holder, substantially as shown and described.

3. The open frame, the ice-holder, and the drip-vessel, constructed, arranged, and combined so that the ice-holder and drip-vessel will bear the specified local relation to the frame and to each other, but be conveniently detachable, substantially as described.

F. H. HAWKINS.

Witnesses:
DOUGLAS JAS. COATES,
C. P. SPEED.